United States Patent [19]

Su et al.

[11] Patent Number: 5,395,533

[45] Date of Patent: Mar. 7, 1995

[54] METHOD OF REMOVING PARTICLES HAVING A SIZE LESS THAN 10 $\mu$M FROM AN AQUEOUS SOLUTION

[75] Inventors: Qingquan Su; Seinoshin Hayami, both of Tokyo; Hiroshi Sasaki, Sendai, all of Japan

[73] Assignee: Pacific Metals Co., Ltd., Tokyo, Japan

[21] Appl. No.: 70,321

[22] PCT Filed: Sep. 29, 1992

[86] PCT No.: PCT/JP92/01244

§ 371 Date: Oct. 22, 1993

§ 102(e) Date: Oct. 22, 1993

[87] PCT Pub. No.: WO93/06906

PCT Pub. Date: Apr. 15, 1993

[30] Foreign Application Priority Data

Sep. 30, 1991 [JP] Japan .................................. 3-276273
Dec. 10, 1991 [JP] Japan .................................. 3-325644

[51] Int. Cl.⁶ .............................................. C02F 1/28
[52] U.S. Cl. .................................. 210/668; 210/669; 210/670; 210/674
[58] Field of Search ............... 210/668, 669, 670, 671, 210/679, 680, 797, 674

[56] References Cited

U.S. PATENT DOCUMENTS 4,151,078 4/1979 Calvin ................................. 210/671
4,168,229 9/1979 Chambers ........................ 210/23 R

FOREIGN PATENT DOCUMENTS 51-64751 6/1976 Japan .
51-74463 6/1976 Japan .
53-46155 4/1978 Japan .

*Primary Examiner*—Ivars Cintins
*Attorney, Agent, or Firm*—Cushman, Darby & Cushman

[57] ABSTRACT

Provided is a method of removing particles having a size of less than 10 $\mu$m from an aqueous solution. The pH of the aqueous solution is first adjusted to be less than 9 and then the aqueous solution is passed through an absorbent of mineral fiber, containing 35 to 65 wt % of $SiO_2$ and 65 to 35 wt % of at least one oxide selected from the group consisting of MgO, CaO, $Al_2O_3$ and FeO. The particles in the aqueous solution adhere to the absorbent and are separated from the aqueous solution. The absorbent is regenerated by passing a descaling solution having a pH greater than 10 through the absorbent. The particles are recovered as a concentrated solution.

14 Claims, No Drawings

METHOD OF REMOVING PARTICLES HAVING A SIZE LESS THAN 10 μM FROM AN AQUEOUS SOLUTION

TECHNICAL FIELD

This invention relates to a method for treating aqueous solution containing fine particles in order to clean the aqueous solution and to collect fine particles contained in the aqueous solution. This invention is applicable in such fields as water supply, sewerage disposal, industrial waste water treatment, oil/water separation and solvent extraction, and is applicable in such manufacturing industries as ceramics, pharmaceutical goods, electronic goods and others.

BACKGROUND ART

It is known that an aqueous solution containing fine solid particles with a size or less than 10 μm in suspension is treated by adding a flocculant to produce relatively large secondary particles, which are then separated as precipitated matters or as floating matters from the aqueous solution.

This known method, however, entails a poor efficiency and high cost because of the use of flocculant chemicals, and is accompanied problems of being contaminated the aqueous solution and fine particles by excessive flocculant chemicals that may remain within them after the treatment since the use of excessive amount of the flocculant is inevitable when the concentration of the fine particles is as dilute as less than 100 ppm.

The treated solution may additionally be subjected to pass through a layer of natural sand in order to remove remaining fine particles. However, the sand layer of natural silicates are not effective in removing fine particles and, moreover, a mesh of the sand layer is easily be clogged in this filtration.

It is also known to pass an aqueous solution containing fine particles directly through a fine mesh web-like filter produced by hollow fiber in order to remove fine particles with the size of less than 10 μm. With this second known method, however, the filter can be easily clogged unless frequent cleaning by back flowing water, which results in a large volume of back flowing water and cumbersome process.

It is also known a method of treating an aqueous solution containing fine particles with a size of less than 10 μm in suspension to use a type of flocculant called "emulsion breaker" in order to flocculate fine particles and to float on the surface of the solution, which are then collected using a surface-hydrophobic absorbent. Air may be blown into the solution to make the flocculates to float on the surface of the solution. This method is, however, accompanied problem of being contaminated the solution by the excessive flocculant that may remain in the solution after the treatment particulary when the concentration of fine particle is $1 \sim 100$ ppm. Besides, the flocculant and the absorbent are relatively expensive to pushup the overall cost of the treatment.

As described above, any known methods are not satisfactorily effective and relatively high cost particularly when the size of fine particles is less than 10 μm and when the concentration of the fine particles in aqueous solution is as dilute as $1 \sim 100$ ppm.

DISCLOSURE OF INVENTION

It is, therefore, an object of the present invention to provide a method of treating an aqueous solution containing fine particles with a size of less than 10 μm in a highly efficient manner and in low cost in order to clean the solution to a high purity by separating fine particles from the solution without using a flocculant chemicals and therefore not contaminating the solution and fine particles even when the concentration of fine particles is as dilute as $1 \sim 100$ ppm.

According to the invention, an aqueous solution containing fine particles with a size of less than 10 μm is preliminary treated to adjust its pH to be less than 9, and then make the solution pass through a packed layer of absorbent in order for the absorbent to absorb fine particles and separate them from the solution. In the present invention, the absorbent is made of mineral fibers containing $SiO_2$ by 35 to 65 wt %, the rest being principally one or more than one Oxides selected from MgO, CaO, $Al_2O_3$ and FeO.

The aqueous solution treated in the present invention contains fine particles with a size of less than 10 μm. Particles with a size of greater than 10 μm contained in aqueous solution can easily be removed from the solution as a precipitated matter or a floating matter in a setting pool. Also, they can be removed by filtration without difficulty. It is, however, difficult to separate fine particles having a size of less than 10 μm, for example particles with a size of $0.1 \sim 1.0$ μm, from the solution by these methods explained above.

According to the present invention, aqueous solution is preliminarily treated to adjust its pH to be less than 9. This adjustment of pH results in providing to the absorbent with a positive electric charge and to the fine particles with a negative electric charge. The absorbent of the present invention has a characteristic of showing a negative phase boundary potential in a basic solution of having a pH of more than 10, whereas it carries a positive phase boundary potential in a neutral solution of having a pH of 5–9 and is more positive in a acidic solution of having more decreased pH value.

On the other hand, fine particle having a size of 10 μm contained in usual contaminated aqueous solution normally has a negative electric potential when the aqueous solution has a pH of greater than 10, also it maintains its negativity of phase boundary potential when the pH of the aqueous solution falls to between 5 and 9.

When an aqueous solution containing fine particles with a size of less than 10 μm is preliminary treated to adjust its pH to be less than 9 and then made the solution to pass through a packed layer of absorbent with an absorbent of the present invention, fine particles in the aqueous solution are adhered to the absorbent by electric attracting force between them and separated from the water.

In case of the aqueous solution which contains solid fine particles, the pH of the aqueous solution may preferably be adjusted to $5 \sim 9$. Usual contaminated water containing fine solid particles often shows a pH between 5 and 9 without any preliminary treatment. When such is the case, it is not necessary for the aqueous solution to be treated for pH adjustment, and the absorbent is positively charged while the fine solid particle is negatively charged so that fine particles are electrically attracted by the absorbent and separated from water. With the method of the present invention, fine particles in the aqueous solution are attracted by and adhere to the absorbent even when a concentration of fine particles is as low as 1~100 ppm, and produce highly clean aqueous solution containing very small amount of fine particles of less than 1 ppm. Since no floccualant is used in the present invention, the aqueous solution and fine particles are not contaminated by such a flocculant and thus can be obtained in a highly pure state.

According to the present invention, a descaling solution having a pH of greater than 10 is prepared separately. After the aqueous solution containing fine particles has been treated and the fine particles has been adhered to the absorbent, the descaling solution will be made to pass through the packed layer of absorbent in order to scale off the fine particles adbering to the absorbent and regenerate the absorbing power of the absorbent so that it may be used further on. As described earlier, the absorbent of the present invention has a negative electric charge in an aqueous solution with a pH greater than 10, and the fine particle contained in the solution also has a negative electric charge in the same descaling solution.

Consequently, when the descaling solution of the present invention having a pH greater than 10 is made to pass through the packed layer of absorbent to which fine particles have been adhered, fine particles are forced to remove off from the absorbent as a result of the electric repelling force existing between the absorbent and the fine particles.

When particles contained in aqueous solution are liquid particles, for example oil particles, relatively large liquid particles with a size of greater than 10 μm can be easily removed from the water by floating them out in a setting pool or by filtration. On the other hand, relatively small liquid particles having a size of less than 10 μm contained in aqueous solution are normally charged with negative surface potential due to a surface activating agent dissolved in the solution.

Liquid fine particles having a size of less than 10 μm contained in the aqueous solution can be separated by adhering to the absorbent when the pH of the solution is adjusted to less than 9 and made to pass through the packed layer of absorbent of the present invention, since the absorbent of the packed layer is positively charged, the fine liquid particle is negatively charged and the fine liquid particle is electrically attracted by the absorbent.

A descaling solution having a pH greater than 10 is also used in order to remove the fine liquid particles adhering to the absorbent from the absorbent, since both of the absorbent as well as fine liquid particles adhering to the absorbent become negatively charged in the descaling solution and fine liquid particles are removed from the absorbent into the descaling solution by a electric repelling force existing between the absorbent and fine liquid particles.

The absorbent to be used in the present invention is made of mineral fibers containing $SiO_2$ by 35~65 wt % and, the rest being principally one or more than one oxides selected from MgO, CaO, $Al_2O_3$ and FeO. The reasons why the absorbent is so defined will be explained below.

Conventional mineral fibers such as glass fibers containing $SiO_2$ by more than 65 wt % show a isoelectric point in highly acidic range of low pH value. Therefore, they cannot electrically attract negatively charged fine particles to a remarkably extent because they have a slightly negative electric potential in neutral aqueous solution having a pH of 5-9. In highly acidic solution, on the other hand, such conventional glass fibers are positively charged and, therefore, capable of attracting fine particles that are negatively charged. However, it is a troublesome and costly operation to adjust usual contaminated aqueous solutions to be in the high acidity.

An absorbent made of mineral fibers comprising $SiO_2$ by less than 65 wt % and one or more than one oxides selected from MgO, CaO, $Al_2O_3$ and FeO by more than 35 wt % according to the present invention is positively charged in an acidic aqueous solution having a pH of less than 7 as well as in a weak basic aqueous solution having a pH of 7~9. As explained earlier, contaminated solutions to be treated normally have a pH of 5-9, and with the absorbent of the present invention, adjustment of pH is unnecessary on these contaminated solutions. Namely, the absorbent of the present invention is positively charged in these contaminated solutions, and attracts and absorbs negatively charged fine particles contained in these contaminated solutions. Thus, according to the present invention, adjustment of pH of the aqueous solution to be treated is simple or unnecessary, which makes the overall treatment simple and inexpensive.

According to the present invention, minimum content of $SiO_2$ in the mineral fibers is 35 wt %. When $SiO_2$ content is lower than 35 wt %, the content of the remaining ingredients including such oxides as MgO and CaO exceeds 65 wt %, which will become liable the mineral fibers of the absorbent to be damaged by dissolving themself into the aqueous solution.

The mineral fibers constituting the absorbent of the present invention preferably has a diameter of 1-20 μm. An absorbent made of mineral fibers of this dimension is more resistible against being clogged with fine particles, and more easy to remove the fine particles in the descaling treatment than other absorbents being made of minerals of granular and powder shape.

The mineral fibers of the present invention can be produced by using slags in metal refineries and natural rocks. Slag in metal refineries includes those slags in ferro-nickle refinery, in iron and steel refinery (blast, furnace slag, converter slag), in ferro-chromium refinery, in ferro-manganese refinery, in copper refinery and in lead refinery. Natural rock includes basalt, periodite, serpentinite, feldspar and quartzite. The absorbent of the present invention is prepared by using fibers made of one or more than one of the above listed materials. Typical example of such fiber includes fibers prepared from slag in ferro-nickel refinery, fibers made from blast furnace slag, rockwool and ceramic fibers.

The absorbent may contain $TiO_2$, $MnO_2$, $Cr_2O_3$, $Na_2O$ and $k_2O$. According to a series of experiments carried out by the inventors of the present invention, these substances contained in the absorbent do not significantly damage its absorbing performance when the total contents of these substances do not exceed 10% by weight.

A packed layer of absorbent of the present invention is prepared by packing with an absorbent in a hollow vessel, for example a hollow cylindrical vessel. The hollow vessel may be evenly filled with an absorbent or, may be filled with a varying dencity along the route of aqueous solution flowing therethrough. An aqueous solution may be made to flow from the top to the bottom or conversely from the bottom to the top of the hollow cylindrical vessel. The hollow cylindrical vessel may also be horizontally placed so that an aqueous solution may flow in a horizontal direction.

Since the absorbent of the present invention has a highly hidrophilic surface, any aqueous solution to be treated encounters only a small resistance when it flows therethrough and, therefore, fine particles having a hydrophobic surface can be effectively separated from the aqueous solution.

In removing off the fine particles from the absorbent, the descaling solution having a pH greater than 10 is made to flow through the packed layer of absorbent.

The descaling solution is alkaline and, since the absorbent is charged electrically negatively in the descaling solution and the fine particles adhering to it is also negatively charged, the fine particles is scaled off from the absorbent into the descaling solution when the descaling solution is made to flow through it. According to a series of experiments carried out by the inventors of the present invention, substantially all of the fine particles adhering to the absorbent can be removed off from it when a volume of the descaling solution twice as much as the volume of the packed layer of absorbent is made to pass through the packed layer of absorbent. Since a volume of the descaling solution which is twice as much as that of the packed layer of absorbent and is relatively a small volume, the descaling solution flowing out from the packed layer of absorbent contains considerably high concentration of fine particles. Thus, the present invention has a performance to collect and recover fine particles from the aqueous solution containing them.

While a descaling solution having a pH greater than 10 has been explained, however, another different descaling solution can also be used in combination with the use of the descaling solution of the present invention. For example, when fine particles to be removed are oily liquid particles, an organic solvent such as ethanol or acetone can be used in combination with a descaling solution of the present invention.

BEST MODE FOR CARRYING OUT THE INVENTION (1) A mineral fiber made from a slag obtained from a ferronickel refinery (Pacific Metals Co., Ltd.) was used as the absorbent. The chemical composition of this mineral fiber was $SiO_2$: 52.8 wt %, MgO: 26.6 wt %, $Al_2O_3$: 13.6 wt %, CaO: 0.5 wt %, Total Fe: 2.4 wt %, Total Cr: 0.5 wt %, and an average diameter of the mineral fiber was 4.0 $\mu$m.

A 150 g of this mineral fiber was packed into an acrylic resin column having a diameter of 70 mm and a length of 185 mm to form a packed layer of absorbent. A contaminated aqueous solution containing 10 ppm of ultrafine hematite particles having an average particle size of 0.13 $\mu$m produced by pyro-hydrolysis was prepared, and the pH of this contaminated aqueous solution was adjusted to 8 by using KOH and $HNO_3$. A descaling solution having a pH of 12.3 was also prepared.

A 40 l of this contaminated aqueous solution was made to flow through the packed layer of absorbent at a flow rate of 500 ml/min. After passing through the packed layer of absorbent, the hematite concentration of the solution was found to be as low as less than 0.5 ppm, which proved that more than 95% of the hematite was captured by the packed layer of absorbent.

Then, a 2 l of the descaling solution was made to flow through the packed layer of absorbent at a flow rate of 250 ml/min. In this descaling treatment, more than 95% of the captured hematite was scaled off from the packed layer of absorbent into the first 1 l of the descaling solution, and the concentrated solution containing hematite particles by nearly 400 ppm was obtained. As a result of this adhering treatment and the subsequent descaling treatment, ultrafine hematite particles in a very dilute solution were collected in the form of the concentrated solution containing the hematite particle 40 times as high as that of the original dilute solution. At the same time, the contaminated solution was cleaned. Also, the packed layer of absorbent was regenerated its adhering power and became ready for further use.

For comparison, a conventional process was carried out as explained below. A 150 g of commercially available glass fiber (containing $SiO_2$ by more than 95 wt %) with an average diameter of 15 $\mu$m was packed into the same acrylic resin column as that explained above. The same contaminated aqueous solution containing hematite was made to pass through the column in the same manner as explained above. After the treatment, the treated solution showed a concentration of the hematite by approximately 7 ppm, and proved a poor performance for removing ultrafine hematite particles from the contaminated aqueous solution.

(2) A 150 g of a mineral fiber made from a blast furnace slag was packed into the same column as described in (1) to prepare the packed layer of absorbent. The chemical composition of this mineral fiber was $SiO_2$: 48.10 wt %, MgO: 8.42 wt %, CaO: 31.07 wt %, $Al_2O_3$: 16.05 wt %, Total Mn: 0.24 wt %, Total Fe: 1.78 wt %, and an average diameter of the mineral fiber was 5 $\mu$m. A contaminated aqueous solution containing 10 ppm of ultrafine quartz particles having an average particle size of 0.3 $\mu$m produced by repeatedly crushing a natural quartz and sorting it was used, and the pH of this contaminated aqueous solution was adjusted to 6.5. A descaling solution having a pH of 12.0 being adjusted by KOH addition was also prepared.

A 20 l of this contaminated aqueous solution was made to flow through the packed layer of absorbent at a flow rate of 500 ml/min. After passing through the packed layer of absorbent, the quartz particle concentration was found to be less than 1 ppm which proved that more than 90% of the quartz particles was captured.

Then, a 1.5 l of the descaling solution was made to flow twice through the packed layer of absorbent at a flow rate of 250 ml/min. In this descaling treatment, more than 99% of the captured quartz particles was scaled off from the packed layer of absorbent into the descaling solution, and the concentrated solution containing quartz particles by nearly 130 ppm was obtained. According to this embodiment, as a result of the adhering treatment and the subsequent descaling treatment, the contaminated aqueous solution was cleaned. Also, ultrafine quartz particles was recovered as the concentrated solution.

For comparison, a conventional process was carried out as explained below. A 150 g of commercially available glass fiber (containing $SiO_2$ by more than 90 wt %) with an average diameter of 15 $\mu$m was packed into the same column as explained above. The contaminated aqueous solution containing quartz particles to the above mentioned concentration was made to pass through the column in the same manner as explained above. After the treatment, the treated solution showed a concentration of quartz by more than 9 ppm, and proved a poor performance for removing ultrafine quartz particles from the contaminated aqueous solution.

(3) A 250 g of a ceramic fiber having a chemical composition of $SiO_2$: 53.2 wt %, $Al_2O_3$: 46.2 wt % having an average diameter of 2.8 μm was packed into the same column as described in (1) to prepare the packed layer of absorbent. A contaminated aqueous solution containing 20 ppm of kerosene produced by adding 1~2 ppm negative ion surface activator (straight chain dodecyl benzene sodium sulfonate) and fiercely stirring it. This contaminated aqueous solution was an emulsion stably containing fine emulsified groubles. The pH of this contaminated aqueous solution was adjusted to 2.8.

A 10 l of this contaminated aqueous solution was made to flow through the packed layer of absorbent at a flow rate of 200 ml/min. After passing through the packed layer of absorbent, the kerosene concentration was decreased to less than 2 ppm which proved that 90% of the kerosene particles was captured.

Then, a 1 l of the descaling solution having a pH of 11.0 was made to flow through the packed layer of absorbent at a flow rate of 200 ml/min. In this descaling treatment, more than 95% of the captured kerosene was scaled off from the packed layer of absorbent.

The same process comprising adhering treatment and descaling treatment of the kerosene particles was successively repeated using the same packed layer of absorbent, and confirmed that more than 90% of kerosene can always be captured. After using the packed layer of absorbent five times, it became visible that the packed layer of absorbent was contaminated by kerosene. But the packed layer of absorbent was perfectly cleaned when a 1 l of industrial ethanol was made to pass through it at a flow rate of 100 ml/min.

For comparison, a conventional process was carried out as explained below. A 250 g of commercially available glass fiber (containing $SiO_2$ by more than 90 wt %) with an average diameter of 15 μm was packed into the same column as explained above. The same contaminated aqueous solution (emulsion) was made to pass through the column in the same manner as explained above. After the treatment the treated solution showed a concentration of kerosene by 10 ppm and proved a poor performance for removing kerosene from the contaminated aqueous solution.

INDUSTRIAL APPLICABILITY

According to the method of the present invention, fine particles contained in an aqueous solution can effectively and greatly reduce its concentration to a very low level simply by making the contaminated aqueous solution to pass through the absorbent layer with or without adjusting the pH of the contaminated aqueous solution. And the separated fine particles can be removed from the absorbent layer simply by making a descaling solution to pass through the absorbent layer in order to regenerate the absorbing power to the absorbent layer and to recover the fine particles as a concentrated solution.

According to the method of the present invention, aqueous solution containing fine particles can be highly cleaned and fine particles contained in the aqueous solution can be recovered in high purity even when the fine particles have a very small size and contained in the aqueous solution in a very low concentration.

What is claimed is:

1. A method of removing particles having a size of less than 10 μm from an aqueous solution comprising the steps of:

adjusting the pH of the aqueous solution to less than 9;

passing the aqueous solution through an absorbent comprising mineral fiber, the mineral fiber comprising 35 to 65 wt % of $SiO_2$ and 65 to 35 wt % of at least one oxide selected from the group consisting of MgO, CaO, $Al_2O_3$ and FeO, whereby the particles in the aqueous solution adhere to the absorbent and are separated from the aqueous solution; and passing a descaling solution having a pH greater than 10 through the absorbent to regenerate the absorbent and to recover the particles as a concentrated solution.

2. A method according to claim 1, wherein the diameter of said mineral fiber is between 1 and 20 μm.

3. A method according to claim 1, wherein said mineral fiber is made from at least one of slags of metal refineries and natural rocks.

4. A method according to claim 1, wherein an amount of $TiO_2$, $MnO_2$, $Cr_2O_3$, $Na_2O$ and $K_2O$ in the mineral fiber is less than 10 wt %.

5. A method according to claim 1, wherein the descaling solution further comprises an organic solvent to recover liquid particles from the mineral fiber.

6. A method of removing solid particles having a size of less than 10 μm from an aqueous solution comprising the steps of:

adjusting the pH of the aqueous solution to between 5 and 9;

passing the aqueous solution through an absorbent comprising mineral fiber, the mineral fiber comprising 35 to 65 wt % of $SiO_2$ and 65 to 35 wt % of at least one oxide selected from the group consisting of MgO, CaO, $Al_2O_3$ and FeO, whereby the solid particles in the aqueous solution adhere to the absorbent and are separated from the aqueous solution; and passing a descaling solution having a pH greater than 10 through the absorbent to regenerate the absorbent and to recover the solid particles as a concentrated solution.

7. A method according to claim 6, wherein the diameter of said mineral fiber is between 1 and 20 μm.

8. A method according to claim 6, wherein said mineral fiber is made from at least one of slags of metal refineries and natural rocks.

9. A method according to claim 6, wherein an amount of $TiO_2$, $MnO_2$, $Cr_2O_3$, $Na_2O$ and $K_2O$ in the mineral fiber is less than 10 wt %.

10. A method of removing liquid particles having a size of less than 10 μm from an aqueous solution comprising the steps of:

adjusting the pH of the aqueous solution to less than 9;

passing the aqueous solution through an absorbent comprising mineral fiber, the mineral fiber comprising 35 to 65 wt % of $SiO_2$ and 65 to 35 wt % of at least one oxide selected from the group consisting of MgO, CaO, $Al_2O_3$ and FeO, whereby the liquid particles in the aqueous solution adhere to the absorbent and are separated from the aqueous solution; and passing a descaling solution having a pH greater than 10 through the absorbent to regenerate the absorbent and to recover the liquid particles as a concentrated solution.

11. A method according to claim 10, wherein the diameter of said mineral fiber is between 1 and 20 μm.

12. A method according to claim 10, wherein said mineral fiber is made from at least one of slags of metal refineries and natural rocks.

13. A method according to claim 10, wherein an amount of $TiO_2$, $MnO_2$, $Cr_2O_3$, $Na_2O$ and $K_2O$ in the mineral fiber is less than 10 wt %.

14. A method according to claim 10, wherein the descaling solution further comprises an organic solvent to recover the liquid particles from the mineral fiber.

* * * * *